United States Patent [19]

Lau

[11] Patent Number: 5,310,851

[45] Date of Patent: May 10, 1994

[54] SPIN-LABELLED THICKENERS

[75] Inventor: Willie Lau, Ambler, Pa.

[73] Assignee: Rohm & Haas, Philadelphia, Pa.

[21] Appl. No.: 13,887

[22] Filed: Feb. 4, 1993

[51] Int. Cl.⁵ .............. C08G 18/00; C08G 18/28; C08G 18/77; C08G 18/81

[52] U.S. Cl. ............... 528/73; 524/591; 528/44; 528/45

[58] Field of Search ............ 528/44, 45, 73; 524/591

[56] References Cited

U.S. PATENT DOCUMENTS 4,891,593  1/1990  Lurie et al. .................. 324/307

OTHER PUBLICATIONS

Hommel, H. et al., "Influence of chain length on conformations of poly(ethylene glycol) chains grafted on silica," Polymer 24, 959–963 (1983).

*Primary Examiner*—Paul R. Michl
*Assistant Examiner*—P. Niland
*Attorney, Agent, or Firm*—Wendy A. Taylor

[57] ABSTRACT

A hydrophobically-modified thickener having at least one hydrophilic portion and at least two terminal hydrophobic portions wherein at least one of the hydrophobic portions contains a stable free radical and its preparation are disclosed. The presence of the stable free radical permits analysis by spin-labelling analytical techniques, such as, for example, electron spin resonance.

6 Claims, 2 Drawing Sheets

SPIN-LABELLED THICKENERS

FIELD OF THE INVENTION

This invention relates to hydrophobically-modified thickeners, and, more particularly, to hydrophobically-modified thickeners containing covalently-bonded stable free radicals.

BACKGROUND OF THE INVENTION

Hydrophobically-modified urethane thickeners are known in the art. See, for example, U.S. Pat. Nos. 4,079,028 and 4,155,892. These thickeners are condensation polymers of polyether polyols and polyisocyanates. The ends of the polymer chains may be "capped" or reacted with a hydrophobic material to introduce hydrophobic groups onto the ends of the polymer chains.

The hydrophobic groups may be introduced into the polymers in a number of ways. For example, if the condensation polymers are made with an excess of polyisocyanates, the resultant polymer has isocyanate end groups which may be reacted with at least one monofunctional hydrophobic organic compound. The monofunctional hydrophobic organic compound may be a hydrophobic alcohol or amine. If the condensation polymer is terminated with a hydroxide, then the polymers may be reacted with a long carbon chain monoisocyanate.

A number of variations to these condensation polymers have been made, including, for example, the substitution of the urethane linkage with other functional groups. See, for example, U.S. Pat. Nos. 4,079,028; 4,155,892; 4,298,511; 4,327,008; 4,337,184; 4,373,083; 3,770,684; 4,426,485; 4,411,819; 2,948,691; 4,209,333 and 4,304,902.

The hydrophobic groups of these thickening polymers are capable of non-specific associations, such as adsorption on surfaces including latex particles and self-aggregation in solution. These associations yield a network of the thickener molecule backbones. It is important to determine the mechanism by which these so-called "associative" thickeners work in order to understand and control the thickening caused them.

SUMMARY OF THE INVENTION

I have synthesized a hydrophobically-modified thickener having at least one hydrophilic portion and at least two terminal hydrophobic portions wherein at least one of the hydrophobic portions contains a stable free radical. The presence of the stable free radical permits analysis by spin-labelling analytical techniques, such as, for example, electron spin resonance.

DETAILED DESCRIPTION OF THE INVENTION

Figure 1:
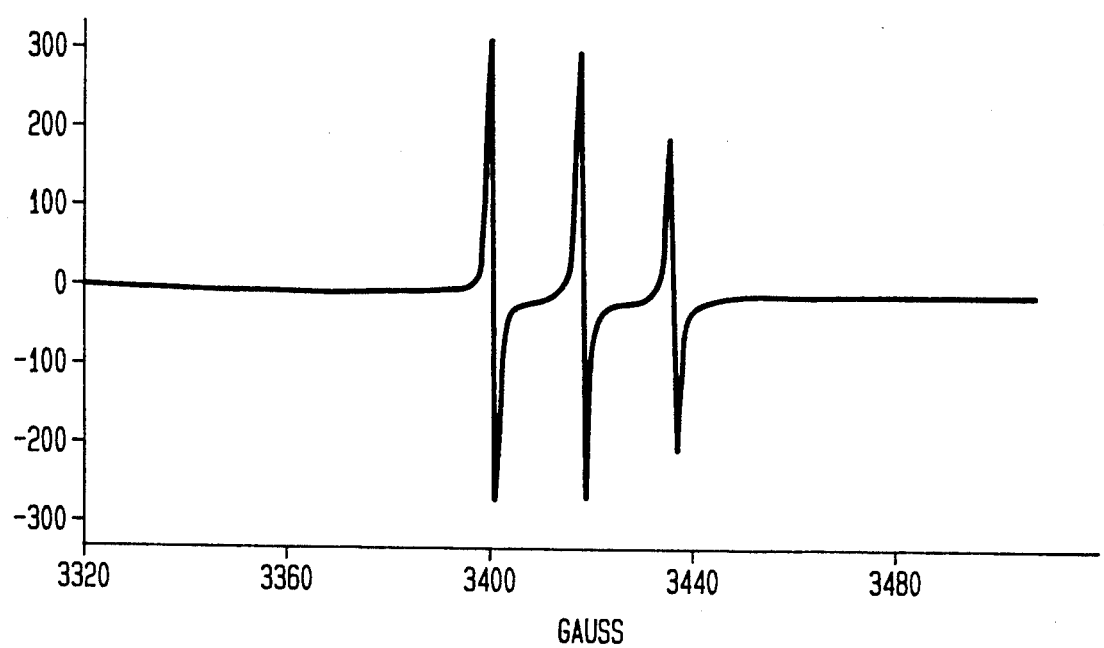
FIG. 1 is the electron spin resonance spectrum of 3% by weight of a thickener of the invention in water.

The thickener of the present invention is a hydrophobically-modified, water-soluble, nonionic polymer having two low molecular weight terminal (external) hydrophobic portions or groups. At least one of the terminal hydrophobic groups contains a covalently-bonded free radical. The polymer may also contain one or more internal hydrophobic groups. The hydrophobic groups together contain a total of at least 20 carbon atoms and are linked through hydrophilic (water-soluble) groups containing polyether segments of at least about 1500, preferably at least about 3000, molecular weight each so that the polymers readily solubilize in water, either by self-solubilization or through interaction with a known solubilizing agent such as a water miscible alcohol or surfactant. The molecular weight of the polymer is of the order of about 10,000 to 200,000.

The polymer is prepared in non-aqueous media and may be the reaction product of:

(a) at least one water-soluble polyether polyol;

(b) at least one water-insoluble organic polyisocyanate; and (c) at least one hydrophobic monofunctional active hydrogen compound containing a covalently-bonded free radical.

The reactants are normally employed in substantially stoichiometric proportions, that is, the ratio of total equivalents of active hydrogen containing reactants to isocyanate reactants is at least 1:1. A slight stoichiometric excess (e.g., about 5-10%) of monofunctional active hydrogen containing compound may be used to eliminate any unreacted isocyanate functionality, thus avoiding toxicity from this source. Greater excesses may be used to increase thickening efficiency.

By "monofunctional active hydrogen compound" is meant an organic compound having only one group which is reactive with isocyanate, such group containing an active hydrogen atom, where any other functional groups, if present, being substantially unreactive to isocyanate. Such compounds include monohydroxy compounds such as alcohols, alcohol ethers; and monoamines; as well as polyfunctional compounds providing the compound is only monofunctional to isocyanates. For example, the primary amines, although difunctional in many reactions, are only monofunctional towards isocyanates, the hydrogen atom in the resulting urea group being relatively unreactive to isocyanate as compared with the hydrogen atom of the amino group or of unhindered alcohols.

The novel feature of the structure of this polymer is the presence of a covalently-bonded free radical in the hydrophobic monofunctional active hydrogen compound. At least one end of the polymer, but not necessarily both ends, needs to be capped with a hydrophobic monofunctional active hydrogen compound containing the covalently-bonded free radical. If both ends of the polymer are not capped with the hydrophobic group containing the covalently bonded free radical, then the remaining end may be capped with conventional capping hydrophobic monofunctional active hydrogen compounds as herein described.

The polyether polyol reactant (a) is an adduct of an alkylene oxide and a polyhydric alcohol or polyhydric alcohol ether, a hydroxyl-terminated prepolymer of such adduct and an organic polyisocyanate, or a mixture of such adducts with such prepolymers.

The organic polyisocyanate reactant (b) include simple di- and triisocyanates, isocyanate-terminated adducts of such polyhydric alcohols and organic di- or triisocyanates, as well as isocyanate-terminated prepolymers of polyalkylene ether glycols and organic dior triisocyanates. While it is preferred that reactant (b) be an organic polyisocyanate, reactants containing one or more functional groups other than isocyanate are also suitable. These functional groups include carboxylic acid, acid chloride, aldehyde, ester, methylol, epoxide, $-C-Cl$ (Williamson synthesis), and

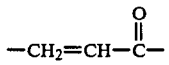

(Michael Addition).

The hydrophobic groups of the polymers occur in the residues of reactants (b) and (c). The terminal (external) hydrophobes are the residues of the monofunctional active hydrogen compounds.

By appropriate selection of reactants and reaction conditions, including proportions and molecular weights of reactants, a variety of polymeric products may be obtained. The products exhibit good thickening properties due to the presence and distribution therein of hydrophilic (polyether) groups (residues of the polyol reactant) and hydrophobic groups (residues of hydrophobic monofunctional active hydrogen compound with or without a covalently-bonded nitroxide radical). From a structural standpoint the products may be classified into three groups as described herein below. Some of the polymers have readily identifiable structures, such as the essentially linear structures of formulas I-IV and the generally star-shaped structures of formulas V-VII. The remaining polymers are complex mixtures.

The polymers may be substituted for known thickeners in any aqueous system in which thickeners are normally utilized and therefore the fields of use of the thickeners of the invention include a host of industrial, household, medical, personal care and agricultural compositions. Thickening in such compositions is often also accompanied by other improvements, such as leveling, flow, stabilization, suspension, high and low shear viscosity control, and binding properties. While all of the polymers of Groups A, B and C are useful as thickeners for latex paints and many other aqueous systems, preferred thickeners for pigment printing pastes and acid dye baths are those of Groups B and C.

In this specification the term "hydrophobe" includes not only the hydrocarbon residues of hydrophobic monofunctional active hydrogen compound reactant with and without a covalently-bonded nitroxide radical but also the combination of such residues with next adjacent urethane and other groups remaining in the structure after reaction. The term "hydrophobe" or like term therefore is used herein to mean all those portions or segments of the polymeric reaction products which contribute to water insolubility. All portions or segments other than the residues of the polyether polyol reactants therefore are hydrophobic.

DESCRIPTION OF THE POLYMERS

The polymeric thickeners useful according to the invention are polyurethanes which may be classified as follows:

Group A—Linear Products

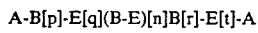

where each of p, q, r and t independently is zero or 1; at least one of q and r is 1, and t is zero when r is zero; provided that,
when q is 1, then
(a) each of p, r and t is zero (as in formula I, below); or
(b) p is zero and each of r and t is 1 (as in formula II, below); or
(c) t is zero and each of r and p is 1 (as in formula III, below); and
when q is zero, then r is 1 and each of p and t is zero (as in formula IV, below).
Polymers coming within the foregoing formula are:

| Examples |
|---|
| I. 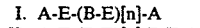 |
| II. 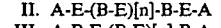 |
| III. 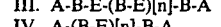 |
| IV. 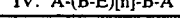 |

The equivalent ratio of total active hydrogen to total isocyanate in the Group A compounds is about 1:1 to 2:1.

Group B—Star-Shaped Products

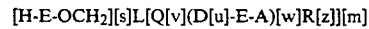

where L is X, Y or $-O-$, Q is $-CH_2C\equiv$, D is $-CH_2O-$, m is 2-4, s is zero to 2, the sum of m and s is the valence of L (2-4), w is 1-3, and each of u and z independently is zero or 1; and where X is a hydrocarbon radical containing at least 1 carbon atom, preferably 1-4 carbon atoms; and Y is a trivalent radical selected from $-OCONH(CH_2)_6N[CONH(CH_2)_6NHCO-O]_2$, $CH_3C[CH_2O-OCNHC_7H_6NHCO]_3$ and $CH_3CH_2C[CH_2O-OCNHC_7H_6NHCO]_3$;
provided that,
(a) when L is X, then u and w are each 1, v and z are each zero, the sum of m and s is 4, and m is at least 2 (as in formula V below);
(b) when L is Y, then u, v and s are each zero, m is 3, w is 2-3, and z is zero or 1 (as in formula VI below); and
(c) when L is $-O-$, then v and u are each 1, w is 1-3, m is 2 and each of s and z is zero (as in formula VII below).
Polymers coming within the foregoing formula are:

| Examples |
|---|
| V. 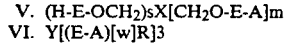 |
| VI.  |
| VII.  |

In each of the polymers of Groups A and B:
A and R are hydrophobic organic radicals containing at least one carbon atom;
B is a divalent hydrophobic group of the structure

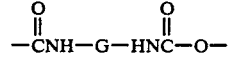

where G is the residue of an organic di- or triisocyanate, the residue having no remaining unreacted isocyanate groups;
E is a divalent, hydrophilic, nonionic polyether group; and n is at least 1, such as about 1-20, preferably 1-10.

In structures V and VII the equivalent ratio of total active hydrogen to total isocyanate is from about 1.2:1 to a stoichiometric excess of isocyanate; and in structure VI from about 1:1 to a stoichiometric excess of active hydrogen.

It will be apparent to the polymer chemist that values of n given in this specification are average rather than absolute values since in reaction products of the type of this invention, the reaction product will often be a mixture of several products having different values for n.

The star-shaped polymer configurations of formulas V-VII result from a polyhydric reactant such as trimethylolpropane or pentaerythritol (residue X in formula V) or a triisocyanate (residue Y in formula VI), or result from a polyhydroxy ether such as dipentaerythritol (Q and D of formula VII). L, Q and D form a central hydrophobic nucleus from which radiate hydrophilic polyether segments E, partially or fully capped (terminated) with hydrophobic groups A and R. The points or arms may have the same or different chain length and may contain hydrophobic segments alternating with hydrophilic portions. When s is greater than zero, partial capping results.

Group C—Complex Polymers

The polymers of Group C are complex mixtures of linear, branched and sub-branched products which form networks of hydrophobes and hydrophobic segments interspersed with hydrophilic segments. The products result from the multitude of different interactions which may take place between the polyfunctional reactants used to form them. The essential reactants are a polyfunctional compound containing at least three hydroxyl or isocyanate groups, a difunctional compound reactive with the polyfunctional compound, and a monofunctional reactant such as a monohydroxy or monoamino compound. The reactants may each be present singly or in mixtures of two or more. The difunctional compound is a diisocyanate (for reaction with the triol or higher polyol) or a diol (for reaction with the triisocyanate) and can also be present singly or in mixtures of two or more. The monohydroxy or monoamino compound, or mixture thereof, is added to the reaction mixture to cap isocyanate of the triisocyanate not reacted with the diol in order to prevent gelation.

In summary, the Group C products are polymeric compositions prepared by reacting:
(a) a polyfunctional reactant selected from an organic polyol having at least three hydroxyl groups, an organic polyisocyanate having at least three isocyanate groups, and mixtures thereof;
(b) a difunctional reactant selected from an organic diol, an organic diisocyanate, and mixtures thereof, the diol being present in the reaction mixture when the polyisocyanate is present and the diisocyanate being present when the polyol is present; and
(c) a monofunctional hydroxyl or amino compound in an amount sufficient to cap any unreacted isocyanate remaining from the reaction of reactants (a) and (b) and to prevent gelation of the reaction mixture; wherein at least one of the polyol and diol contains at least one water soluble polyether segment of at least 1500 molecular weight, wherein the total carbon content of all hydrophobic groups is at least 20 and the average molecular weight of the polyurethane product is about 10,000-200,000.

As a general rule, the foregoing conditions are true for all of the polymers of Groups A, B and C. That is, the polymers will provide good thickening if:
(1) the polyether segments have molecular weights of at least 1500, preferably 3,000-20,000;
(2) the polymers contain at least two hydrophobic groups and at least one water soluble polyether segment linking the hydrophobes;
(3) the sum of the carbon atoms in the hydrophobic groups being at least 20, preferably at least 30; and
(4) the total molecular weight is about 10,000-200,000, preferably 12,000-150,000.

The optimum polyether content will depend on the bulk and distribution of the hydrophobic groups in the polymer. Whereas a total polyether molecular weight of 4,000-5,000 may be suitable when the polymer contains small external and internal hydrophobes, the polyether content may have to be substantially increased when heavier and/or more extensively branched hydrophobic groups are to be built into the polymer, such as long chain fatty polyols or amines. About 200 carbon atoms in the hydrophobic portion is the practical upper limit although it will be understood that it is a relative matter since the proportion of polyether may be increased to offset increased hydrophobicity. However, as total molecular weight increases the viscosity increases and ease of handling decreases, and therefore the economic usefulness of the products is substantially diminished.

The relatively low molecular weights of the polymers in conjunction with their nonionic character promote their efficiency as thickeners. The polymers are believed to thicken by an associative mechanism such as micellar or other form of association, rather than by molecular weight or chain extension alone. For example, 1.0% by weight of the polymers in an aqueous dispersion will provide thickening equivalent to that afforded by other nonionic thickeners at much higher concentrations. The ability to obtain good thickening at relatively low molecular weight and solids level also promotes other properties, such as softening effects on fabrics when the polymers are used in fabric finishing compositions. In addition, the use of organic isocyanate residues as internal or external hydrophobes also makes the polymers relatively stable to hydrolytic degradation, thereby greatly expanding their usefulness, as in systems requiring extended shelf life.

In certain applications, such as latex paints, polymers of the invention can provide excellent flow and leveling as well as thickening. In other applications, such as paper coating compositions where high shear thickening is important, polymers of the invention can easily be selected which are superior in this respect, while also retaining good thickening capabilities and low shear viscosity.

PREPARATION OF THE POLYMERIC PRODUCTS

The first class of reactants (a) used to form the polyurethanes of the invention are water-soluble polyether polyols. Typically, these are adducts of an aliphatic, cycloaliphatic or aromatic polyhydroxy compound such as a polyhydric alcohol or polyhydric alcohol ether and an alkylene oxide such as ethylene oxide or propylene oxide, or they may be hydroxyl-terminated prepolymers of such adducts and an organic polyisocyanate. The adducts or prepolymers may be mixtures of two or more of such adducts or prepolymers, and mixtures of such adducts with prepolymers may also be used. The polyhydric alcohols include not only the simple glycols such as ethylene glycol and propylene glycol but also hydroxy compounds containing three or more hydroxyl groups, such as polyalkylolalkanes (e.g., trimethylol propane, pentaerythritol) and polyhydroxyalkanes (e.g., glycerol, erythritol, sorbitol, mannitol, and the like). The polyhydric alcohol ethers usually are adducts of polyhydric alcohols and alkylene oxides but in some cases are present as by-products with other polyhydroxy compounds. For example, pentaerythritol as ordinarily prepared contains about 15% of the ether, dipentaerythritol. Typical of cycloaliphatic polyhydric compounds are cyclopentandiol-1,2,1,4-cyclohexandiol, hexahydroxycyclohexane, and the like. The polyhydroxy compounds also include aromatic compounds such as di-and trihydroxy benzene and the like.

The foregoing and numerous other hydroxyl compounds, adducts and prepolymers are well known and thoroughly described in the technical literature, including standard textbooks such as Whitmore, *Organic Chemistry*, 2nd Edition, Dover Publications, Inc., New York, 1961, two volumes, pages 302-330, 547-559 and 671-674.

A convenient source of the hydrophilic polyether polyol adducts is a polyalkylene glycol (also known as a polyoxyalkylene diol) such as polyethylene glycol, polypropylene glycol or polybutylene glycol, of about 4,000-20,000 molecular weight. However, adducts of an alkylene oxide and a monofunctional reactant such as a fatty alcohol, a phenol or an amine, or adducts of an alkylene oxide and a difunctional reactant such as an alkenolamine (e.g., ethanolamine) are also useful. Such adducts are also known as diol ethers and alkanolamine ethers.

Suitable compounds providing polyether segments also include amino-terminated polyoxyethylenes of the formula $NH_2(CH_2CH_2O)[x]H$ where x ranges from about 10 to 200. Such compounds are sold under the trademark "Jeffamine", a typical compound being "Jeffamine 2000" of about 2000 molecular weight.

The second class of reactants (b), the water insoluble organic polyisocyanates, or isocyanates used to form the hydroxyl-terminated prepolymers included among reactants (a), may be aliphatic, cycloaliphatic or aromatic, such as the following, and may be used singly or in admixture of two or more thereof including mixtures of isomers:

1,4-tetramethylene diisocyanate
1,6-hexamethylene diisocyanate ("HDI")
2,2,4-trimethyl-1,6-diisocyanatohexane
1,10-decamethylene diisocyanate
1,4-cyclohexylene diisocyanate
4,4'-methylenebis(isocyanatocyclohexane)
1-isocyanato-3-isocyanatomethyl-3,5,5-trimethylcyclohexane
m- and p-phenylene diisocyanate
2,6- and 2,4-tolylene diisocyanate ("TDI")
xylene diisocyanate
4-chloro-1,3-phenylene diisocyanate
4,4'-biphenylene diisocyanate
4,4'-methylene diphenylisocyanate ("MDI")
1,5-naphthylene diisocyanate
1,5-tetrahydronaphthylene diisocyanate
polymethylene polyphenylisocyanates sold under the brand name "PAPI," such as "PAPI 135" (equivalent weight of 133.5 and average isocyanate functionality of 2.7) and
"PAPI 901" (equivalent weight of 133 and average isocyanate functionality of 2.3)
aromatic triisocyanate adduct of trimethylol propane and tolylene diisocyanate sold under the brand name "Mondur CB-75"
aliphatic triisocyanate product of the hydrolytic trimerization of 1,6-hexamethylene diisocyanate, sold under the brand name "Desmodur N"
$C_{36}$ dimer acid diisocyanate sold under the brand name "DDI", based on dimer acids as discussed in *J. Am. Oil Chem. Soc.* 51,522 (1974).

The polyisocyanates also include any polyfunctional isocyanate derived from reaction of any of the foregoing isocyanates and an active hydrogen compound having a functionality of at least two, such that at least one isocyanate group remains unreacted. Such isocyanates are equivalent to chain-extending an isocyanate terminated isocyanate/diol reaction product with a reactant containing at least two active hydrogen atoms in a manner well known in polyurethane synthesis.

A variety of other useful polyisocyanates are set forth in texts on urethane chemistry, including "Advances In Urethane Science and Technology", K. S. Frisch and S. L. Reegan, editors, Technomic Publishing Company, Inc., Volume 1 (1971) and Volume 2 (1973), and references cited therein. The isocyanates may contain any number of carbon atoms effective to provide the required degree of hydrophobic character. Generally, about 4 to 30 carbon atoms are sufficient, the selection depending on the proportion of the other hydrophobic groups and hydrophilic polyether in the product.

At least one of the ends of the polymer must contain a hydrophobic group containing a covalently-bonded free radical. The hydrophobic group containing covalently-bonded free radical may be formed from any monofunctional active hydrogen compounds having a covalently-bonded free radical. Suitable monofunctional active hydrogen compounds having a covalently-bonded free radical include compounds containing a stable nitroxide radical, for example, derivatives of 4,4-dimethyl-3-oxazolinyloxyl radical, sold under the name DOXYL, such as 5-DOXYL-stearic acid and 7-DOXYL-stearic acid; derivatives of 2,2,5,5-tetramethyl-1-pyrrolidinyloxy radical, sold under the name PROXYL, such as 3-(aminomethyl)-PROXYL and 3-carbamoyl-PROXYL; derivatives of 2,2,6,6-tetramethyl-1-piperinyloxy radical, sold under the name TEMPO such as 4-hydroxy-TEMPO or TEMPOL and 4-amino-TEMPO; and 2,2,5,5,-tetramethyl-3-piperin-1-oxyl-3-carboxylic acid in its acid chloride form. Derivatives of 2,2-diphenyl-1-picrylhydrazyl radical are also useful. Derivatives of TEMPO are preferred, with 4-hydroxy-TEMPO most preferred.

Representative of other monofunctional active hydrogen compounds useful in the invention for capping the polymer which do not contain a covalently-bonded nitroxide radical include those wherein the functional group is hydroxyl, including the fatty ($C_1$–$C_{24}$) alcohols such as methanol, ethanol, octanol, decanol, dodecanol, tetradecanol, hexadecanol, and cyclohexanol; phenolics such as phenol, cresol, octylphenol, nonyl and dodecyl phenol; alcohols ethers such as the monomethyl, monoethyl and monobutyl ethers of ethylene glycol, and the analogous ethers of diethylene glycol; alkyl and alkaryl polyether alcohols such as straight or branched ($C_1$–$C_{22}$) alkanol/ethylene oxide and alkyl phenol-/ethylene oxide adducts (e.g., lauryl alcohol, t-octylphenol or nonylphenolethylene oxide adducts containing 1–250 ethylene oxide groups); and other alkyl, aryl and alkaryl hydroxy compounds including mixtures thereof, such as $C_{10}$–$C_{20}$ normal alcohol mixtures known as "Alfol" alcohols.

Amino compounds may be used in place of all or a portion of the monohydroxy compounds as hydrophobic monofunctional active hydrogen compounds not containing a covalently-bonded nitroxide radical. Amino compounds include primary or secondary aliphatic, cycloaliphatic or aromatic amines such as the straight or branched chain alkyl amines, or mixtures thereof, containing about 1–20 carbon atoms in the alkyl group. Suitable amines include n- and t-octyl amine, n-dodecyl amines, $C_{12}$–$C_{14}$ or $C_{18}$–$C_{20}$ t-alkyl amine mixtures, and secondary amines such as N,N-dibenzyl amine. N,N-dicyclohexyl amine and N,N-diphenyl amine. The lower alkyl ($C_1$–$C_7$) amines may be used if there is sufficient hydrophobic residue in the product from other sources such as isocyanate or hydroxyl compound to provide a total of at least ten carbon atoms in the terminal groups (taken together) of the polymeric products. The amino compounds may contain more than one active hydrogen atom provided that under normal reaction conditions it is only monofunctional towards an isocyanate group. A primary amine is an example of such a compound.

The foregoing and numerous other useful monohydroxy and amino compounds are well known as described in standard organic textbooks and other reference works, such as the Whitmore text noted above, as on pages 102–138 and 165–170.

The polymers are prepared according to techniques generally known for the synthesis of urethanes preferably such that no isocyanate remains unreacted. Water should be excluded from the reaction since it will consume isocyanate functionality. Anhydrous conditions are accomplished by azeotropic distillation to remove water, by heating under a nitrogen sparge, or by prior drying of reactants.

If desired, the reaction may be run in a solvent medium in order to reduce viscosity in those reactions leading to higher molecular weight products. High viscosity in the reaction medium causes poor heat transfer and difficult mixing. Generally, a solvent is useful when molecular weights of 30,000 or higher are encountered. Below this molecular weight a solvent is not required. When used, the solvent should be inert to isocyanate and capable of dissolving the polyoxyalkylene reactant and the urethane product at reaction temperature. Suitable inert solvents include non-active hydrogen containing compounds such as benzene, toluene, xylene and other well-known solvents rich in aromatic hydrocarbons such as the solvents sold under the trademarks "Solvesso 100" or "Solvesso 150", as well as esters such as ethyl acetate, butyl acetate and "Cellosolve" acetate, and dialkyl ethers of ethylene glycol, diethylene glycol, and the like. Many other well-known solvents can also be used.

Reaction temperature is not critical. A convenient reaction temperature is about 40° C. to 120° C., preferably about 60° C. to 110° C. Reaction temperature should be selected to obtain reasonably fast reaction rate while avoiding undesirable side reactions, such as isocyanate-urethane condensation.

The order of reactant charging is not critical in most cases. However, in some instances, as where the reactants are higher molecular weight or polyfunctional, order of addition obviously should be controlled to avoid gelation. For example, to avoid high molecular weight while obtaining a good proportion of hydrophobic character, it may be desirable to first charge the hydrophobe-contributing reactant, such as monohydroxy compound, amine or monoisocyanate, followed by the polyoxyalkylene glycol. If higher molecular weight is desired, the hydrophobe-contributing reactant may be charged after the polyoxyalkylene glycol, or a portion of the hydrophobic reactant may be charged initially and the balance added after the remaining reactants. Charging also may be continuous or semi-continuous, if desired.

Order of addition, reactant proportions and other conditions of reaction thus may be varied to control the geometry, molecular weight and other characteristics of the products, in accordance with well-known principles of polyurethane synthesis.

As is evident from their formulas, the Group A polymers are conveniently prepared by forming a prepolymer of a polyoxyalkylene glycol and a diisocyanate, and then capping the prepolymer with a monoisocyanate or mono-diisocyanate mix, when the prepolymer has hydroxyl terminal groups, or with a monohydric or amino compound (or alkylene oxide adduct of a monohydric compound or an amino compound) when the prepolymer has isocyanate terminal groups.

The Group B polymers are prepared in a similar manner except for use of a polyfunctional compound such as trimethylolpropane or a triisocyanate as a reactant. For example, generally star-shaped polymers result when a triisocyanate is reacted with a monohydroxy compound-ethylene oxide adduct. Suitable polyisocyanates are "Desmodur N" and "Mondur CB-75", described below.

The more complex polymer mixtures of Group C result from reaction of a polyol (at least three hydroxyl groups) or triisocyanate with a diisocyanate or polyether diol, respectively, followed by capping of unreacted isocyanate with a monol or monoamine. Examples of suitable polyols are polyalkylolakanes such as trimethylolpropane or trimethylolbutane, hydroxy compounds having ether linkages such as the erythritols, (dipentaerythritol, tripentaerythritol, and the like) and hydroxyalkanes containing three or more hydroxy groups, such as glycerol, butane tetraol, sorbitol, mannitaol and the like.

Prepolymers, adducts or other reactants containing ester groups should be avoided, due to hydrolytic instability of products containing such groups. However, the reactants may contain any other groups provided such groups are inert, i.e., they do not interfere in formation of the desired products. For example, halogens such as chlorine and bromine normally would not prevent formation of useful polymers.

SPIN-LABELLING

Because of the presence of the stable free radical in the thickener polymer of this invention, the thickener polymer may be analyzed using analytical techniques, such as, for example, electron spin resonance ("ESR") or electron paramagnetic resonance ("EPR"). ESR is a spectroscopic analytical technique employing microwave radiation to detect the presence of free radicals. The technique is very sensitive to the conformation and degree of free rotation of the spin center (free radical). Through the changes in the ESR pattern and line widths, the degree and tightness of the hydrophobic association between the thickener polymer itself and between the thickener polymer and the aqueous-based material, such as a latex polymer, to which the thickener polymer is added, may be determined. Furthermore, the change in the hydrophobic interaction as a result of a shift in conditions, such as temperature and the incorporation of additives, for example surfactants, can be determined.

The following examples are intended to illustrate the invention; they are not intended to limit the invention as other applications of the invention will be obvious to those of ordinary skill in the art.

EXAMPLE 1

Preparation of Polymer

Thickener 1

A mixture of 70 grams polyethylene glycol (molecular weight=35,000) and 210 grams of toluene were predried by azeotropic distillation. The mixture was cooled to 80° C. In a separate flask, 3.1 grams 1,1'-methylenebis(4-isocyanatocyclohexane) and 0.1 grams dibutyltin dilaurate were added to the 300 grams predried toluene at 80° C. The mixture of polyethylene glycol and toluene was then gradually added to the flask over 90 minutes. The final mixture was held at 80° C. for 60 minutes. To the mixture, 2.75 grams 4-hydroxy-2,2,6,6-tetramethylpiperidinyloxy was added in portions such that no residual isocyanate was detected by infrared spectroscopy. The resulting solid polymer, isolated through evaporation of toluene in a vacuum oven, was recrystallized using toluene and hexane. The molecular weight of the polymer was determined by gel permeation chromatography indicating a weight-average molecular weight of 49,100 and a number-average molecular weight of 40,000.

Thickener 2

A mixture of 175 grams polyethylene glycol (molecular weight=8,600) and 400 grams of toluene were predried by azeotropic distillation. The mixture was cooled to 70° C. and 7.3 grams 1,1'-methylenebis(4-isocyanatocyclohexane) was added followed by 1.8 grams 4-hydroxy-2,2,6,6-tetramethylpiperidinyloxy and 0.16 grams dibutyltin dilaurate. After 2 hours at 70° C., 1.8 grams 4-hydroxy-2,2,6,6-tetramethylpiperidinyloxy was added and the mixture was maintained at 70° C. for an additional 2 hours. The resulting solid polymer, isolated through evaporation of toluene in a vacuum oven, was recrystallized using toluene and hexane. The molecular weight of the polymer was determined by gel permeation chromatography indicating a weight-average molecular weight of 53,800 and a number-average molecular weight of 28,900.

EXAMPLE 2

Thickeners in Water

Aqueous solutions (10% and 20%) of Thickeners 1 and 2 were prepared. The viscosity of Thickeners 1 and 2 was determined with a Brookfield viscometer fitted with a #3 spindle. The viscosities are reported in Table 2.1.

TABLE 2.1

| | Weight-Average Molecular Weight | Viscosity 10% solution (centipoise) | Viscosity 20% solution (centipoise) |
|---|---|---|---|
| Thickener 1 | 49100 | 5378 | — |
| Thickener 2 | 53800 | 156 | 6,060 |

The thickeners of the invention behave as associative thickeners and demonstrate a thickening efficiency similar to other hydrophobically-modified thickeners.

EXAMPLE 3

Spectroscopic Analysis of Thickeners in Water

The electron spin resonance (ESR) spectra of the thickeners in aqueous solution were measured using a supersil quartz flat cell with a 0.1 mm thickness. The spectrum of a 3% aqueous solution of Thickener 1 is shown in FIG. 1.

The sharp lines indicate exclusively motionally fast components of the spin label when the Thickener 1 is in water alone. The spectra of Thickeners 1 and 2 in aqueous solutions of 3% to 20% by weight showed the same exclusively motionally fast components as the 3% aqueous solution of Thickener 1 shown in FIG. 1.

EXAMPLE 4

Spectroscopic Analysis of Thickeners in Acrylic Latex Emulsion

Figure 2:
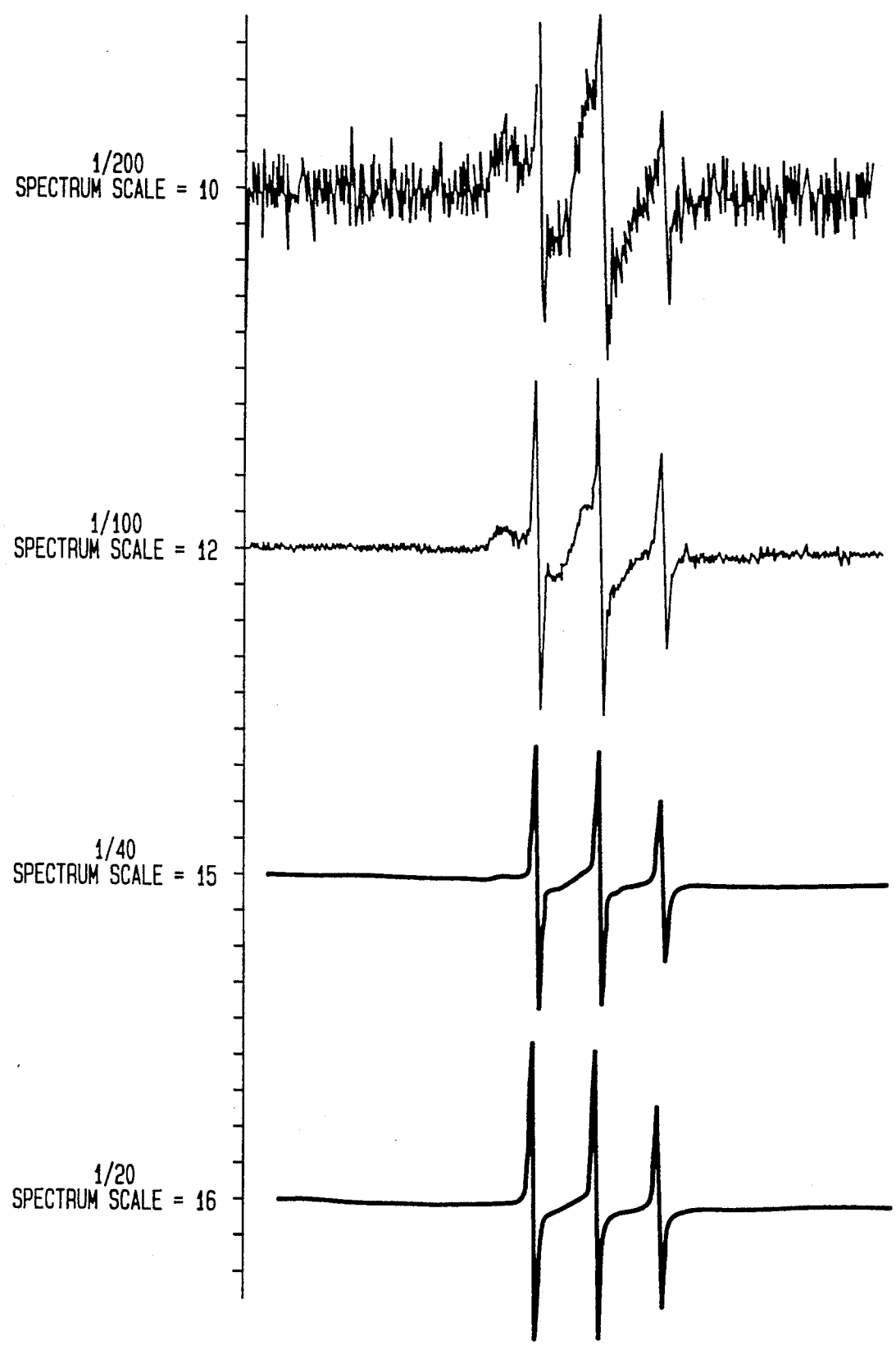
FIG. 2 is the electron spin resonance spectra of a thickener of the invention in an acrylic latex emulsion at levels of 1 part by weight thickener solids to 20, 40, 100 and 200 parts by weight acrylic latex solids. The total latex polymer solids were kept constant at 20%.

The electron spin resonance (ESR) spectrum of Thickener 1 in an acrylic latex emulsion at ratios of 1 part by weight thickener solids to 20, 40, 100 and 200 parts by weight acrylic latex solids was measured using a supersil quartz flat cell with a 0.1 mm thickness. The spectra of Thickener 1 in the acrylic latex emulsion is shown in FIG. 2.

The spectra of Thickener 1 in the acrylic latex emulsion shows the superpositioning of two components. The first component is equivalent to a rotationally free spin label. The second component is equivalent to a motionally slowed spin label indicating that at least some of the hydrophobic portions of Thickener 1 containing the free radical were absorbed onto the surface of the acrylic latex emulsion particles. The % absorption of Thickener 1 onto the acrylic latex emulsion particles was determined from the spectra to be 39, 54, 80 and 92 respectively for 1/20, 1/40, 1/100 and 1/200 of weight ratio of thickener solids to acrylic latex solids.

EXAMPLE 5

Thickeners in Paint Formulations

The ingredients in Table 5.1 (in grams) were used to formulate the paints [Paint 1 (Comparative), Paint 2 (Comparative) and Paint 3]. The grind ingredients were first mixed and then added to the latex polymer, coalescent and defoamer to form the letdown. Finally thickener and water were added.

TABLE 5.1

| Ingredient | Paint 1 (Comparative) | Paint 2 (Comparative) | Paint 3 |
|---|---|---|---|
| Grind | | | |
| Water | 49.39 | 53.35 | 53.35 |
| Dispersant (Tamol ® 731) (25%) | 5.32 | 5.75 | 5.75 |
| Propylene glycol | 11.57 | 12.50 | 12.50 |
| Antifoaming agent (Patcote ® 801) | 0.93 | 1.00 | 1.00 |
| Titanium dioxide (Ti-Pure ® R-900) | 115.70 | 124.98 | 124.98 |

TABLE 5.1-continued

| Ingredient | Paint 1 (Comparative) | Paint 2 (Comparative) | Paint 3 |
|---|---|---|---|
| Extender (Optiwhite ®) | 46.30 | 50.01 | 50.01 |
| Clay extender (Attagel ® 50) | 2.32 | 2.51 | 2.51 |
| Acrylic latex emulsion (Rhoplex ® AC-64) (60.5% solids) | 162.02 | 175.00 | 175.00 |
| Coalescent (Texanol ®) (2,2,4-trimethyl-3-hydroxypentyl acetate) | 4.90 | 5.29 | 5.29 |
| Antifoaming agent (Patcoate ® 801) | 1.85 | 2.00 | 2.00 |
| Hydrophobically-modified Thickener: | | | |
| Acryloid ® RM-1020 (20% solids) | 70.79 | — | — |
| Acryloid ® RM-825 (25% solids) | — | 7.40 | — |
| Thickener 1 (100% soilds) | — | — | 9.04 |
| Water | 70.89 | 110.11 | 110.13 |

EXAMPLE 6

Testing of Thickeners in Paint Formulations

Several tests were performed to demonstrate that the thickeners of the invention behave similarly to commercially-available hydrophobically-modified thickeners. The results are reported in Table 6.1.

Viscosity

Stormer Viscosity

The low shear viscosity of the paints were measured using a Krebs-Stormer Viscometer using a 50 gram weight to obtain a speed of 200 revolutions/minute. The viscosity measurements are reported in Table 6.1 in Krebs Units (KU).

ICI Viscosity

The high shear viscosity of the paints were measured using an ICI Viscometer. The viscosity measurements are reported in Table 6.1 in poise.

Leneta Flow

The flow and leveling of each paint were determined. Each paint was applied to a separate Leneta sealed 12H chart at 25° C. and hung vertically to dry overnight. The dried charts were compared to reference standards in a Leneta Level-Luminator. The flow and leveling results are reported in Table 6.1 as the number of the reference standard which most nearly matched the appearance of each paint.

Leneta Sag

The sag of each paint was determined. Each paint was applied to a separate Leneta sealed 12H chart at 25° C. and hung vertically to dry overnight. The dried charts were rated on a scale of 1 to 10 (1=worst and 10=best) by appearance of the brushouts. The sag results are reported in Table 6.1.

Gloss (20° and 60°)

The gloss of each paint was measured. Each paint was drawndown on a Leneta 5C chart with a 3 mil Bird film applicator and dried at constant temperature and humidity for 7 days. The gloss of each paint was measured on a Hunter Glossmeter at 20° and 60°, according to ASTM D-523-89 Test Method. The gloss results are reported in Table 6.1.

TABLE 6.1

| | Paint 1 (Comparative) | Paint 2 (Comparative) | Paint 3 |
|---|---|---|---|
| Viscoisty | | | |
| Stormer (KU) | 93 | 91 | 90 |
| ICI (poise) | 3.7 | 0.6 | 2.4 |
| Leneta Flow | 10 | 9 | 9+ |
| Leneta Sag | 6 | 6 | 6 |
| Gloss | | | |
| 20° | 3 | 3 | 3 |
| 60° | 6 | 6 | 6 |

I claim:

1. A hydrophobically-modified thickener comprising a polymer comprising:
    (a) at least one hydrophilic portion; and
    (b) at least two terminal hydrophobic portions, wherein at least one terminal hydrophobic portion comprises a covalently bonded stable free radical wherein said polymer is the reaction product of:
        (i) at least one water-soluble polyether polyol;
        (ii) at least one water-insoluble organic polyisocyanate; and
        (iii) at least one hydrophobic monofunctional active hydrogen compound containing a covalently-bonded stable free radical.

2. The hydrophobically-modified thickener of claim 1 wherein the covalently-bonded stable free radical is a nitroxide radical.

3. The hydrophobically-modified thickener of claim 2 wherein the nitroxide radical is a 4-hydroxy-2,2,6,6-tetramethyl-1-piperidinyloxy radical.

4. A method of spin labelling a hydrophobically-modified thickener comprising reacting:
    (a) at least one water-soluble polyether polyol;
    (b) at least one water-insoluble organic polyisocyanate; and
    (c) at least one hydrophobic monofunctional active hydrogen compound containing a covalently-bonded stable free radical.

5. The method of claim 4 wherein the covalently-bonded stable free radical is a nitroxide radical.

6. The method of claim 5 wherein the nitroxide radical is a 4-hydroxy-2,2,6,6-tetramethyl-1-piperidinyloxy radical.

* * * * *